(12) United States Patent
Bellini et al.

(10) Patent No.: US 12,172,880 B2
(45) Date of Patent: Dec. 24, 2024

(54) TRANSFER STAR-WHEEL AND METHOD

(71) Applicant: GEA PROCOMAC S.P.A., Sala Baganza (IT)

(72) Inventors: Vittorio Bellini, San Secondo Parmense (IT); Gianmaria Raboini, Collecchio (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 587 days.

(21) Appl. No.: 17/281,406

(22) PCT Filed: Sep. 27, 2019

(86) PCT No.: PCT/EP2019/076298
§ 371 (c)(1),
(2) Date: Mar. 30, 2021

(87) PCT Pub. No.: WO2020/070026
PCT Pub. Date: Apr. 9, 2020

(65) Prior Publication Data
US 2022/0041421 A1 Feb. 10, 2022

(30) Foreign Application Priority Data

Oct. 5, 2018 (IT) .......................... 102018000009188

(51) Int. Cl.
*B67B 3/20* (2006.01)
*B65G 47/84* (2006.01)

(52) U.S. Cl.
CPC .......... *B67B 3/2013* (2013.01); *B65G 47/846* (2013.01); *B65G 2201/0247* (2013.01)

(58) Field of Classification Search
None
See application file for complete search history.

(56) References Cited

U.S. PATENT DOCUMENTS 3,309,836 A * 3/1967 Hallowell, Jr. ..... B29C 66/8161
215/382
RE32,237 E * 9/1986 Willingham .......... B67B 3/2033
53/317

(Continued)

FOREIGN PATENT DOCUMENTS

| DE | 102016207589 A1 | 11/2017 |
| JP | 2011162225 A | 8/2011 |
| WO | 2018019404 A1 | 2/2018 |

*Primary Examiner* — Tanzim Imam
(74) *Attorney, Agent, or Firm* — Pearne & Gordon LLP; Bryan M. Gallo

(57) ABSTRACT

Transfer star-wheel (1) of containers (100) made of thermoplastic material provided with concave closures (200), comprising: a rotary carousel (2) having a plurality of supporting stations (3) for supporting the containers (100), each supporting station (3) comprising a pocket (4) at the external circumference of the rotary carousel (2) for receiving and supporting the neck (100*b*) of one of the containers (100), characterized in that each supporting station (3) comprises a striking element (5) located above the corresponding pocket (4), said striking element (5) being configurable in an operative position in which it is in contact with the concave closure (200) of the container (100) supported in the corresponding pocket (4), and a neutral position in which it is spaced from the concave closure (200).

11 Claims, 3 Drawing Sheets

SEZ. A-A

(56) References Cited

U.S. PATENT DOCUMENTS 5,230,203 A * 7/1993 Wu .......................... B67C 7/00
53/503
2017/0073206 A1* 3/2017 Parsons ................ B67B 3/2066

* cited by examiner

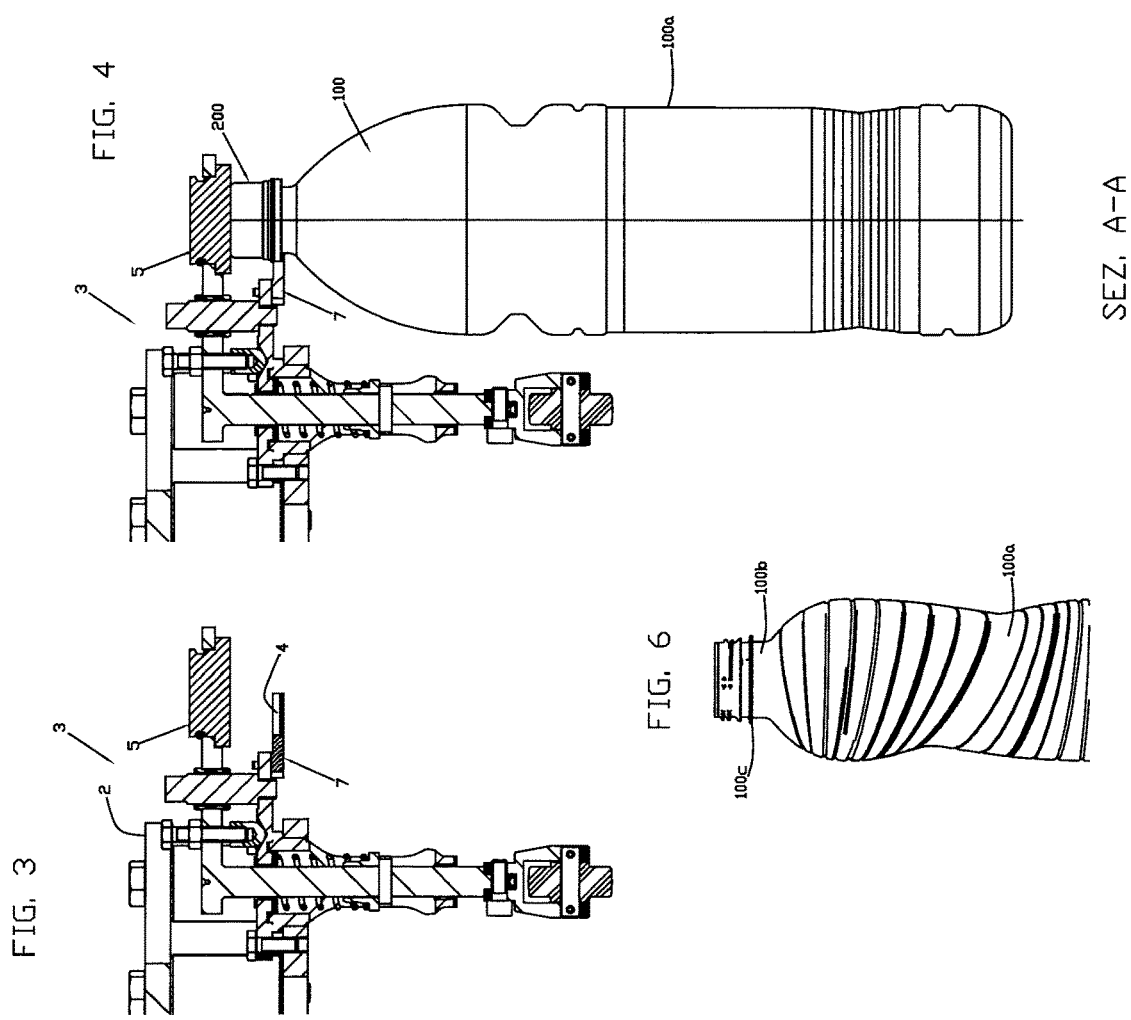

TRANSFER STAR-WHEEL AND METHOD

TECHNICAL FIELD

The present invention relates to a transfer star-wheel for containers made of thermoplastic material provided with concave closures and a capping plant comprising this transfer star-wheel. The invention also relates to a method for conveying containers made of thermoplastic material provided with concave closures out of a capping unit.

The reference sector is the bottling of so-called "sensitive" food products, that is, products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

BACKGROUND ART

Packaging lines using aseptic technology are already known in the prior art, wherein the various operations take place in a controlled contamination environment, so that the bottled products can be stored for a prolonged period of time and have chemical/physical and organoleptic stability even at room temperature.

A modern concept of an aseptic bottling line envisages:
sterilization of the parison using chemical agents or radiations;
"aseptic" forming of the container starting from the sterilized parison;
filling and capping of the filled container, to be carried out in a sterile environment.

In this context, attention turns to the capping unit of the containers in a non-aseptic line, by means of pressure caps or capsules.

According to the prior art, the transfer star-wheel of the capped containers exiting the capping machine comprises a rotary carousel with equispaced pockets formed at its external circumference. Each pocket receives and supports one of the containers by the neck. To prevent the containers from oscillating during the rotation of the carousel, a counter-guide is provided that abuts the body of the containers.

In the event of a change of format, it is necessary to act on some elements of the transfer star-wheel, including the counter-guide, which could be repositioned or even replaced as a function of the shape and size of the body of the containers.

In the aseptic context, these manual interventions are not feasible with the use of gloves for handling; it is instead necessary to open the access door of the isolator that preserves the capping unit, with the consequent loss of sterility. Upon completion of the procedure, the sterile conditions of the environment must be restored, resulting in an evident loss of time due to downtime of the line.

DISCLOSURE OF THE INVENTION

In this context, the technical task underpinning the present invention is to provide a transfer star-wheel and a method for conveying containers made of thermoplastic material provided with concave closures that obviates the drawbacks of the prior art mentioned above.

In particular, an aim of the present invention is to provide a transfer star-wheel and a method for conveying containers made of thermoplastic material provided with concave closures, which prevent the oscillation of the containers of any format.

A further aim of the present invention is to provide a transfer star-wheel and a method for conveying containers made of thermoplastic material provided with concave closures, in which the sterilization times are shortened and the operations for maintaining sterile conditions are simplified or reduced.

The defined technical task and the specified aims are substantially reached by a transfer star-wheel of containers made of thermoplastic material provided with concave closures, comprising:
a rotary carousel having a plurality of supporting stations for supporting the containers, each supporting station comprising a pocket at the external circumference of the rotary carousel for receiving and supporting the neck of one of the containers,
characterized in that each supporting station comprises a striking element located above the corresponding pocket, said striking element being configurable in an operative position in which it is in contact with the concave closure of the container supported in the corresponding pocket, and a neutral position in which it is spaced from the concave closure.

In accordance with one embodiment, each striking element has the shape of a concave shell which, in the operative position, partially wraps the concave closure.

In accordance with another embodiment, each striking element is a solid body which, in the operative position, presses on the concave closure.

In accordance with one embodiment, the transfer star-wheel further comprises guiding means configured to contact the neck of each container on an opposed side with respect to the rotary carousel.

For example, the guiding means consist in a profile that extends at least partially outside the rotary carousel following the circumferential extension thereof.

Preferably, the profile consists in a plate having a partially annular shape.

The stated technical task and specified aims are substantially achieved also by a capping plant for capping containers made of thermoplastic material, comprising:
a capping unit comprising a plurality of capping stations for applying concave closures on the containers;
a transfer star-wheel according to the present invention, located downstream of the capping unit for receiving the capped containers, i.e. the containers to which the concave closures have been applied.

Preferably, an output conveying belt is located downstream of the transfer star-wheel.

The defined technical task and the specified aims are substantially achieved by a method for conveying containers made of thermoplastic material provided with concave closures out of a capping unit, comprising the steps of:
supporting each container by its neck;
arranging a striking element in contact with the corresponding concave closure applied on the container while the container is supported by its neck in order to prevent the oscillation thereof.

In accordance with one embodiment, a step is also provided of contacting the neck of each container with guiding means on an opposed side with respect to the rotary carousel.

In accordance with one embodiment, the striking element is laid on the concave closure.

In accordance with another embodiment, the striking element is laid and pressed on the concave closure.

BRIEF DESCRIPTION OF DRAWINGS

Further characteristics and advantages of the present invention will more fully emerge from the indicative and thus non-limiting description of a preferred but not exclusive embodiment of a transfer star-wheel and a method for conveying containers made of thermoplastic material provided with concave closures, as illustrated in the accompanying drawings in which:

FIGS. 3 and 4 show an embodiment of a supporting station of the transfer star-wheel of FIG. 2 in a sectioned side view, respectively with and without a container;

FIG. 4a shows a detail (striking element) of the supporting station of FIGS. 3-4, in a sectioned side view;

FIG. 4b shows a variant of the striking element of FIG. 4a, in a sectioned side view;

FIG. 5 shows another embodiment of the supporting station, in a sectioned side view (with a container);

FIG. 6 shows a container, in a sectioned view.

DETAILED DESCRIPTION OF PREFERRED EMBODIMENTS OF THE INVENTION

Figure 1A:
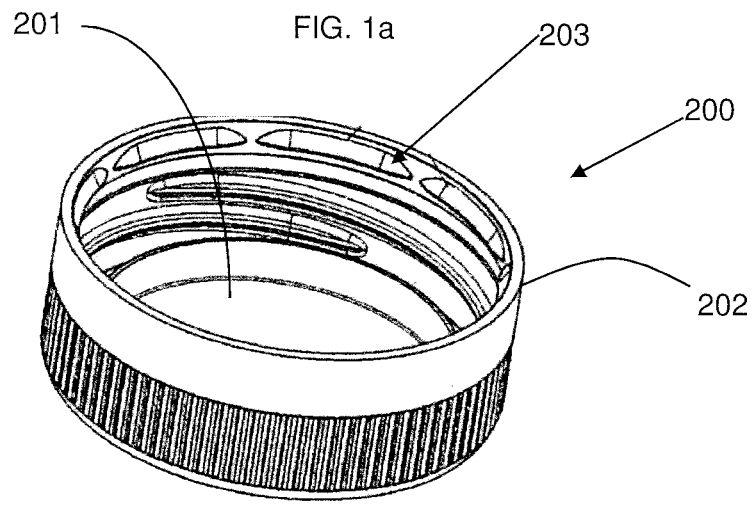
FIGS. 1a and 1b show two different types of concave closures, respectively a flat cap and a sport cap, in a perspective view.

With reference to the figures, the number 1 indicates a transfer star-wheel of containers 100 made of thermoplastic material, such as PET, provided with concave closures 200.

Each container 100 has a tubular body 100a and a threaded neck 2b.

In this context, the term concave closure is intended as a cap or a capsule. Preferably, the concave closure is made of polymeric material.

FIG. 1a shows a first format of a concave closure: it is a flat cap.

Figure 1B:
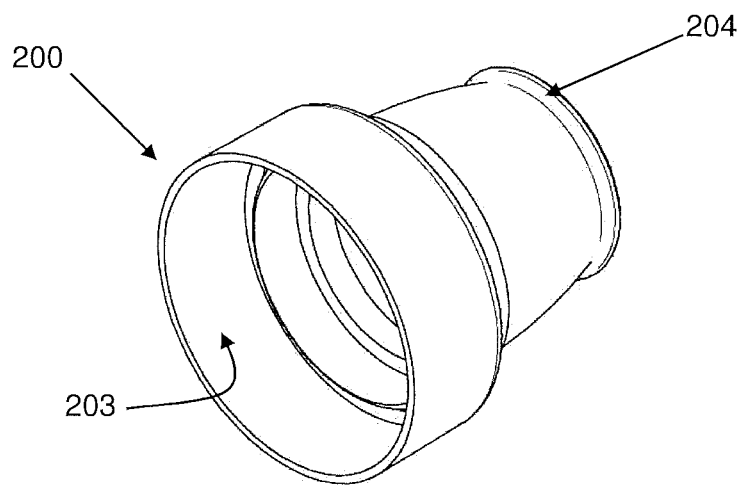

FIG. 1b shows a second format of a concave closure: it is a sport cap.

The flat-type concave closure 200 has a disc-like base 201, a side surface 202 substantially cylindrical in shape and which extends from the disc-like base 201 and with the latter defines a cavity 203. On the opposed side from the disc-like base 201, the cavity 203 is open so as to receive the mouth of the container 100.

The sport-type concave closure 200 has a projecting spout 204 instead of a disc-like base.

Figure 2:
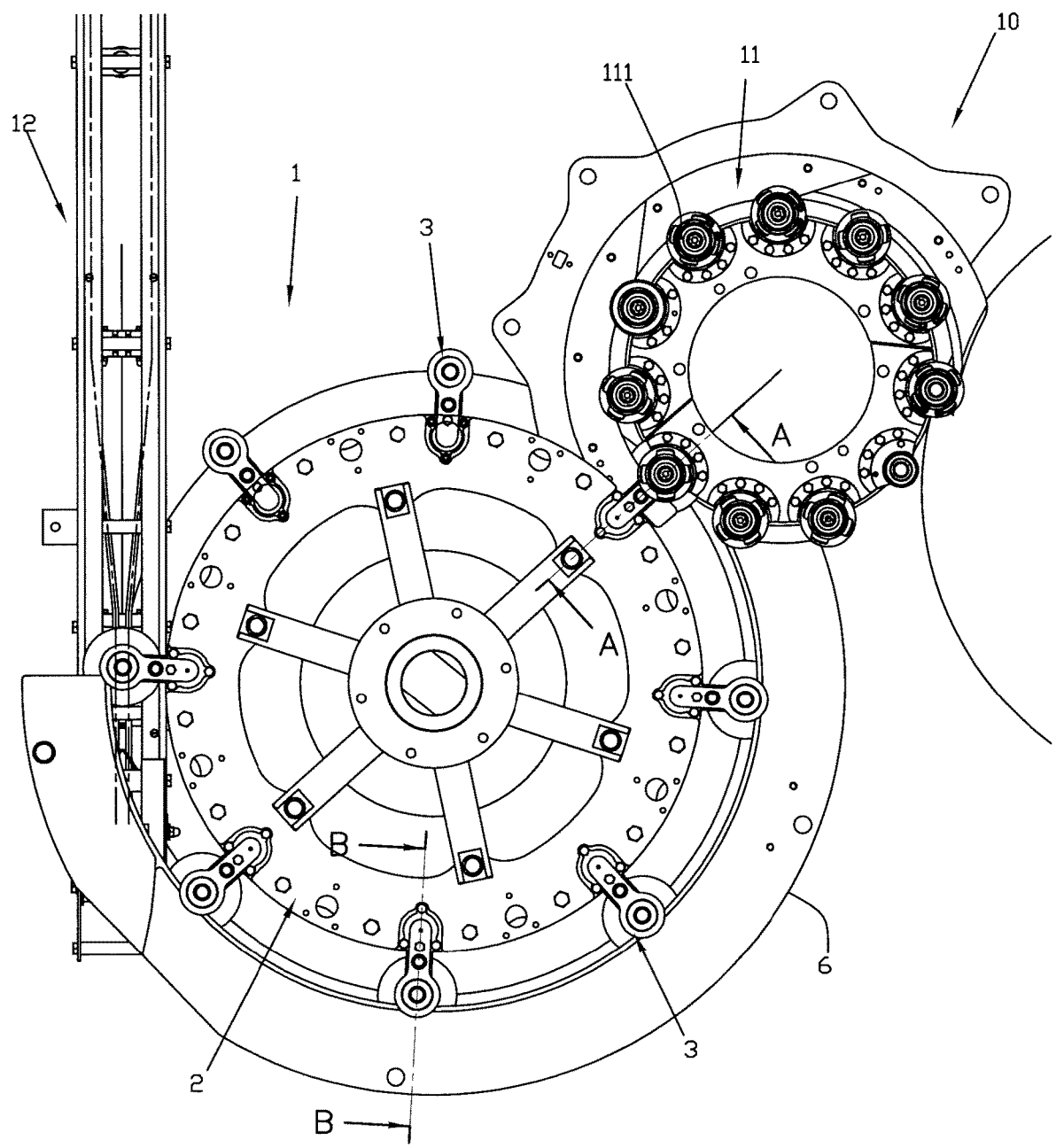
FIG. 2 shows a capping plant comprising a transfer star-wheel of containers made of thermoplastic material provided with concave closures, according to the present invention, in a view from above.

As can be seen in FIG. 2, the transfer star-wheel 1 can be used in a capping plant 10 comprising a capping unit 11 provided with a plurality of capping stations 111 for applying the concave closures 200 on the containers 100.

In particular, the transfer star-wheel 1 is located downstream of the capping unit 11 for receiving the containers 200 previously capped and upstream of an output conveying belt 12.

The transfer star-wheel 1 comprises a rotary carousel 2 having a plurality of supporting stations 3 of the containers 100.

Each supporting station 3 comprises a pocket 4 at the external circumference of the rotary carousel 2 for receiving and supporting the neck 100b of one of the containers 100.

Preferably, the pockets 4 are equispaced along the external circumference of the rotary carousel 2.

For example, these pockets 4 can be formed directly in the rotary carousel 2, consisting in particular in recesses or arched indentations, for example semicircular, formed on the external circumferential edge of the rotary carousel 2.

Alternatively, forks 7 are solidly fixed to the rotary carousel 2, each fork 7 defining a pocket 4.

In particular, each container 100 rests with its bague 100c on the edge of the rotary carousel 2 or on the fork that defines one of the pockets 4.

In this context, the technical term "bague" relates to a circumferential protuberance of the neck 100b of the container 100, located below the threaded zone of the neck 100b.

Originally, each supporting station 3 comprises a striking element 5 located above the corresponding pocket 4.

The striking element 5 can assume two configurations: an operative position in which it is in contact with the concave closure 200 of the container 100 supported in the corresponding pocket 4, and a neutral position in which it is spaced, i.e. raised, from the concave closure 200.

The means for moving the striking element 5 between the two positions are of known type and will not be further described.

In accordance with a first embodiment shown in FIG. 4a, each striking element 5 is a solid body having a substantially flat surface that contacts the concave closure 200 and presses on it.

In accordance with one embodiment, each striking element 5 has the shape of a concave shell (or bell shape) configured to be applied on the concave closure 200 in such a way as to partially wrap it. In particular, the striking element 5 partially wraps the concave closure 200 when it is in the operative position. In this case, thanks to the partial wrapping of the closure, it is sufficient that the striking element 5 lays on the underlying closure (without pressing it).

For example, FIG. 5 shows the application of the striking element 5 having the shape of a concave shell to a sport cap 200.

In this case, the concave shell 5 is configured to be applied on the spout 204 of the sport cap 200 in such a way as to wrap it.

The concave shell 5 can also be applied to a flat cap 200, as shown in FIG. 4b. In this case, the concave shell 5 wraps the upper part of the disc-like base 201 and the first portion of the lateral surface 202 of the flat cap 200.

The striking element 5 is made of metal, for example steel, or made of plastic.

In accordance with one embodiment, guiding means 6 are also present, configured to contact the neck 100b of each container 100 on an opposed side with respect to the rotary carousel 2.

Preferably, the guiding means 6 are arranged in such a way as to contact below the part of the bague 100c exposed towards the outside of the pocket 4, i.e. the part of the bague 100c that is not laying on the rotary carousel 2 or on the fork 7.

In accordance with a preferred embodiment, these guiding means 6 consist of a profile that extends at least partially externally to the rotary carousel 2 following the circumferential extension thereof.

In particular, the profile 6 consists of a plate having a partially annular shape which is arranged below the part of the bague 100c exposed towards the outside of the pocket 4.

For example, the guiding means 6 are present when heavy containers 100 are moved, of 1.75-2 litre capacity, or when the transfer star-wheel 1 conveys more than 40,000 bottles/hour or for applications with sport caps (FIG. 1*b*) in which the striking element 5 contacts the cap without pressing on it.

The characteristics of the transfer star-wheel and the method for conveying containers made of thermoplastic material provided with concave closures, according to the present invention, prove to be clearly indicated in the description provided.

In particular, the striking element contacts (and in certain cases also exerting a pressure) the concave closure of the container inserted in the pocket so as to prevent the oscillation (i.e. the pendular movement) of the container during the rotation of the carousel.

Since the striking element acts on the concave closure and not on the body of the container, it is not necessary to replace it when a change of format occurs.

The guiding means also contribute to maintaining the containers in an upright position. Since the guiding means (and in particular the profile) abut under the bague and not on the body of the containers, any changes in format do not require replacements.

The invention proposed herein therefore reduces the downtime of the line and the problems connected to restoring sterile conditions.

The invention claimed is:

1. A capping plant for capping containers made of thermoplastic material, the capping plant comprising:
    a capping unit comprising at least four capping stations for applying concave closures on the containers; and
    a transfer star-wheel for conveying the containers made of thermoplastic material, the containers being provided with the concave closures that are applied on the containers,
    said transfer star-wheel comprising a rotary carousel having a plurality of supporting stations for supporting the containers,
    each supporting station comprising a pocket at an external circumference of the rotary carousel for receiving and supporting a neck of one of the containers,
    each supporting station comprising a striking element located above the corresponding pocket,
    each striking element being configurable in an operative position in which it is in contact with a concave closure of a container supported in the corresponding pocket, and in a neutral position in which it is spaced from said concave closure,
    wherein said transfer star-wheel is located downstream of said capping unit for receiving the containers that have been capped with the concave closures.

2. The capping plant according to claim 1, wherein each striking element has a shape of a concave shell which, in the operative position, partially wraps said concave closure.

3. The capping plant according to claim 1, wherein each striking element is a solid body that, in the operative position, presses on the concave closure.

4. The capping plant according to claim 1, further comprising guiding means configured to contact the neck of each container on an opposed side with respect to the rotary carousel.

5. The capping plant according to claim 4, wherein said guiding means consists of a profile that extends at least partially externally to the rotary carousel following a circumferential development of the rotary carousel.

6. The capping plant according to claim 5, wherein said profile consists of a plate having a partially annular shape.

7. The capping plant according to claim 1, further comprising an output conveying belt located downstream of said transfer star-wheel.

8. A method for conveying capped containers made of thermoplastic material and provided with concave closures, the method being performed by the capping plant of claim 1, the method comprising the steps of:
    moving each capped container out of one of the at least four capping stations and into one of the plurality of supporting stations;
    supporting each container by its neck; and
    arranging each striking element in contact with a corresponding one of the concave closures applied on one of the containers while the one of the containers is supported by its neck in order to prevent oscillation of the one of the containers.

9. The method according to claim 8, wherein the step of arranging each striking element in contact with the corresponding one of the concave closures consists of laying said striking element on the corresponding one of the concave closures.

10. The method according to claim 8, wherein the step of arranging each striking element in contact with the corresponding one of the concave closures further comprises a step of pushing said striking element on the corresponding one of the concave closures.

11. The method according to claim 8, further comprising a step of contacting the neck of each container with guiding means on a side opposite to the rotary carousel.

\* \* \* \* \*